United States Patent

Takada

Patent Number: 5,394,915
Date of Patent: Mar. 7, 1995

[54] TIRE FOR HEAVY LOAD THAT PREVENTS CENTER WEAR AND RIVER WEAR

[75] Inventor: Yoshiyuki Takada, Kobe, Japan

[73] Assignee: Sumitomo Rubber Industries, Ltd., Kobe, Japan

[21] Appl. No.: 958,755

[22] Filed: Oct. 9, 1992

[30] Foreign Application Priority Data

Oct. 9, 1991 [JP] Japan .................. 3-290693

[51] Int. Cl.$^6$ .................. B60C 3/00; B60C 11/06
[52] U.S. Cl. .................. 152/209 R; 152/454
[58] Field of Search .................. 152/209 R, 209 D, 454

[56] References Cited

U.S. PATENT DOCUMENTS

| | | | |
|---|---|---|---|
| 4,037,637 | 7/1977 | Arimura et al. | |
| 4,082,132 | 4/1978 | Arai et al. | |
| 4,724,878 | 2/1988 | Kabe et al. | 152/454 |
| 4,739,812 | 4/1988 | Ogawa et al. | 152/209 R |
| 4,955,416 | 9/1990 | Takeuchi et al. | 152/209 R |
| 4,976,300 | 12/1990 | Takehara et al. | 152/454 |

FOREIGN PATENT DOCUMENTS 2133201  5/1990  Japan .................. 152/454

*Primary Examiner*—Adrienne Johnstone

[57] ABSTRACT

A tire for heavy load with a aspect ratio of 80% or less has five ribs which are a center rib extending on a tire equator, a pair of outer ribs extending along a tread edge and a pair of intermediate ribs each extending between the center rib and the outer ribs. An outer end line of the intermediate rib extends in the circumferential direction in zigzags. In a state of 5% internal pressure, a distance (X) from the tire equator line to a center line (Q) of the zigzagged outer end line is in a range of 0.25 to 0.275 times the tread width (WT). A tread radius of curvature R under the state of 5% internal pressure and a difference (Y=y2−y1) satisfy the following equation (1):

$$-0.001R + 0.4 \text{ mm} \leq Y \leq -0.00357R + 2.4 \text{ mm} \qquad (1)$$

wherein the difference (Y=y2−y1) being the difference between an inflation amount (y1) at the tire equator from the state of 5% internal pressure to a state of the standard internal pressure and an inflation amount (y2) at the center line (Q) of zigzagged outer end line of the intermediate rib from the state of 5% internal pressure to a state of the standard internal pressure.

1 Claim, 6 Drawing Sheets

TIRE FOR HEAVY LOAD THAT PREVENTS CENTER WEAR AND RIVER WEAR

The present invention relates to a high speed tire for heavy load enhanced in durability that prevents an uneven wear, more particularly a center wear occurring along a tire equator and a river wear occurring along the edges of circumferential grooves.

BACKGROUND OF THE INVENTION

As road conditions have been improved, a tire for heavy load used, for example, in a truck or a bus has more opportunities to run on a freeway and is used for a longer period. The durability of tire has been conventionally determined by a breakage such as a crack formed in a tire. However, nowadays, the value of a tire depends on the wear resistance because uneven wear tends to increase when a car runs on a freeway.

As such uneven wear, so-called center wear which occurs along the tire equator and so-called river wear which occurs along edges of circumferential grooves near tread edges have been particularly observed.

Conventionally, such uneven wear has been considered to be caused by a profile of the tread pattern.

However, the inventor determined out that, even in tires having same tread pattern, some produce a center wear and others a river wear and the wear amount is also different.

After an intensive study to find the causation factors, the inventor found that the center wear and river wear are not related only with tire's radius of curvature as conventionally believed, but also from other factors.

The inventor took note of a relationship between such uneven wear and the inflation amount of the tire's internal pressure, which has never been analyzed before. That is, the relationship between the center wear and the river wear and a dimensional difference between a state under 5% of a standard internal pressure, which is the minimum pressure required to maintain the shape of tire, and a state under standard internal pressure.

Thus, in an old-tire which exhibited considerable center wear and river wear and a new tire having the same shape and size, the inflation amounts were measured at the central area and shoulder area of the tread surface. As a result, it was confirmed that a tire with a considerable amount of center wear showed a larger inflation amount in the shoulder area than in the central area, while a tire with a considerable amount of river wear showed a smaller inflation amount in the shoulder area than in the central area.

Accordingly, the invention was completed by finding that the amounts of center wear and river wear could be reduced by controlling the difference in inflation amounts between the shoulder area and the central area, which further leads to a formation of a tire that produces neither center wear nor river wear.

SUMMARY OF THE INVENTION

It is hence a primary object of the invention to provide a tire for heavy load which prevents an occurrence of uneven wear and increases the durability.

According to one aspect of the present invention, a tire for heavy load with an aspect ratio of 80% or less has a tread part divided by four circumferential main grooves into five ribs which are a center rib extending on a tire equator line, a pair of outer ribs extending along a tread edge and a pair of intermediate ribs each extending between the center rib and the outer rib. An outer end line in the tire axial direction of said intermediate rib extends in the circumferential direction in zigzags. In a state of 5% internal pressure when the tire is mounted on a regular rim and inflated by 5% of a standard internal pressure, a distance (x) from the tire equator line (P) to a center line (Q) of said zigzagged outer end line of the intermediate rib is in a range of 0.25 to 0.275 times the tread width (WT). And a single tread radius of curvature R under the state of 5% internal pressure and a difference (Y=y2−y1) satisfy the following equation (1):

$$-0.001R + 0.4 \text{ mm} \leq Y \leq -0.00357R + 2.4 \text{ mm} \tag{1}$$

wherein the difference (Y=y2−y1) is the difference between an inflation amount (y1) at the tire equator line (P) from the state of 5% internal pressure to a state of the standard internal pressure and an inflation amount (y2) at the center line (Q) of the zigzagged outer end line of the intermediate rib from the state of 5% internal pressure to a state of the standard internal pressure.

As an outer end line of an intermediate rib is formed in a zigzag shape, the grip performance is increased, thereby increasing the traction force.

The distance X is set in an range of 0.25 to 0.275 times the tread width. If the distance X is less than 0.25 times the tread width, the draining performance of tread shoulder area deteriorates, thereby reducing the braking function on a wet road surface. In contrast, if the distance X exceeds 0.275 times the tread width, the zigzagged outer end line of the intermediate rib comes closer to the tread edge. As the result, the deterioration of ground-contact pressure near the zigzagged outer end line enhances slipping in the circumferential direction of tire, which tends to cause an uneven wear called river wear along the zigzagged outer end line.

It is known that the shape and area of ground-contact surface vary by changing the radius of curvature in the tread surface. This means that, when a tire size is fixed, by reducing the radius of curvature, a ground-contact surface S1 is extended, as shown in FIG. 6, in the circumferential direction centering about the tire equator C, while, by increasing the radius of curvature, a ground-contact surface S2, as shown in FIG. 7, comes to have an hourglass shape extending in the tire axial direction.

A state of 5% internal pressure herein means when a tire is subject to a basic pressure which is used to set various dimensional sizes of a tire under the minimum internal pressure that enables the tire to be in its shape. However, since a tire is used under a standard internal pressure or a nearly standard internal pressure, the tire is inflated more in the radial and axial directions thereof in comparison with the state of 5% internal pressure. In addition, the inflation amount is different depending on the thickness of tire and the arrangement of carcass and belt layer. Moreover, as such inflation is not uniform through the entirety of tire, the ground-contact area changes while the tire is running, and the distribution of ground-contact pressure in various parts of ground-contact surface changes correspondingly.

An inflation amount from the state of 5% internal pressure to the state of standard internal pressure in a new tire of the same type as a conventional five-rib tire, where the so-called center wear M was observed in the center rib as shown in FIG. 10, is measured. Then, it was found that the inflation amount y1 at the tire equator line P was smaller than the inflation amount y2 at the center line Q of the zigzagged outer end line of the intermediate rib. Therefore, the difference Y(=y2−y1) comes to be positive. And a ground-contact surface S3, when a standard internal pressure is applied, shows an hourglass-like shape with a narrower width part h1 near the center rib where the width is decreased in the circumferential direction of tire. In such narrower width part h1, the ground-contact pressure is reduced comparing with other parts of the ground-contact surface S3, which causes a center wear.

Besides the difference Y, the center wear also relates to the size of radius of curvature R, and, it was confirmed that a relation of the difference Y to the radius of curvature R which did not cause the center wear was within such range as expressed by the following equation (2):

$$Y \leq -0.00357R + 2.4 \, mm \tag{2}$$

On the other hand, an inflation amount in a new tire of the same type as a conventional five-rib tire, where the so-called river wear N in the zigzagged end line of the intermediate rib as shown in FIG. 11, is measured as in the study of center wear. Then, it was found that the inflation amount y1 at the tire equator line P was larger than the inflation amount y2 at the center line Q, the difference Y(=y2−y1) comes to be negative. And, under the standard internal pressure, the ground-contact surface S4 showed a double hourglass shape, as in FIG. 9, with narrower width parts h2 and h2 formed near the outer end line of the intermediate rib where the width is decreased in the circumferential direction of tire. A decrease in ground-contact pressure in the narrower width parts h2 and h2 in comparison with other parts causes the river wear.

The river wear, similar to the center wear, also relates to the radius of curvature R, and it was confirmed that the relation of the difference Y to the radius of curvature R which did not causes river wear was within such range as expressed by the following equation (3):

$$-0.001R + 0.4 \, mm \leq Y \tag{3}$$

FIG. 5 is a diagram showing ranges where the center wear M and the river wear N occur, respectively, as the relation of the radius of curvature R to the difference Y. As known from the diagram, a high speed tire for heavy load according to the invention falls within a range A where neither center wear M nor river wear N occurs, which is expressed by the following equation (1):

$$-0.001R + 0.4 \, mm \leq Y \leq -0.00357R + 2.4 \, mm \tag{1}$$

Within the range expressed by the equation (1), the ground-contact surface shows a smooth rectangular shape without any concave or convex as shown in FIG. 5, and the ground-contact pressure is distributed uniformly.

It is preferable that a tire falls within a range A1 between single-dotted broken lines of FIG. 4 showing the relation of radius of curvature R to the difference Y, which is expressed by the following equation (4):

$$-0.001R + 0.5 \, mm \leq Y \leq -0.00357R + 3.4 \, mm \tag{4}$$

A plurality of prototype tires (shown by marks ⊙ and ◯ in the FIGURE) were produced, whose radius of curvature R and difference Y fell within the range expressed by the equation (1), and by testing the durability, it was found that all of them showed a good performance with no center wear or river wear observed.

BRIEF DESCRIPTION OF THE DRAWINGS

An embodiment of the present invention will now be described by way of example, referring to the attached drawings, in which.

DETAILED DESCRIPTION OF THE INVENTION

Figure 1:
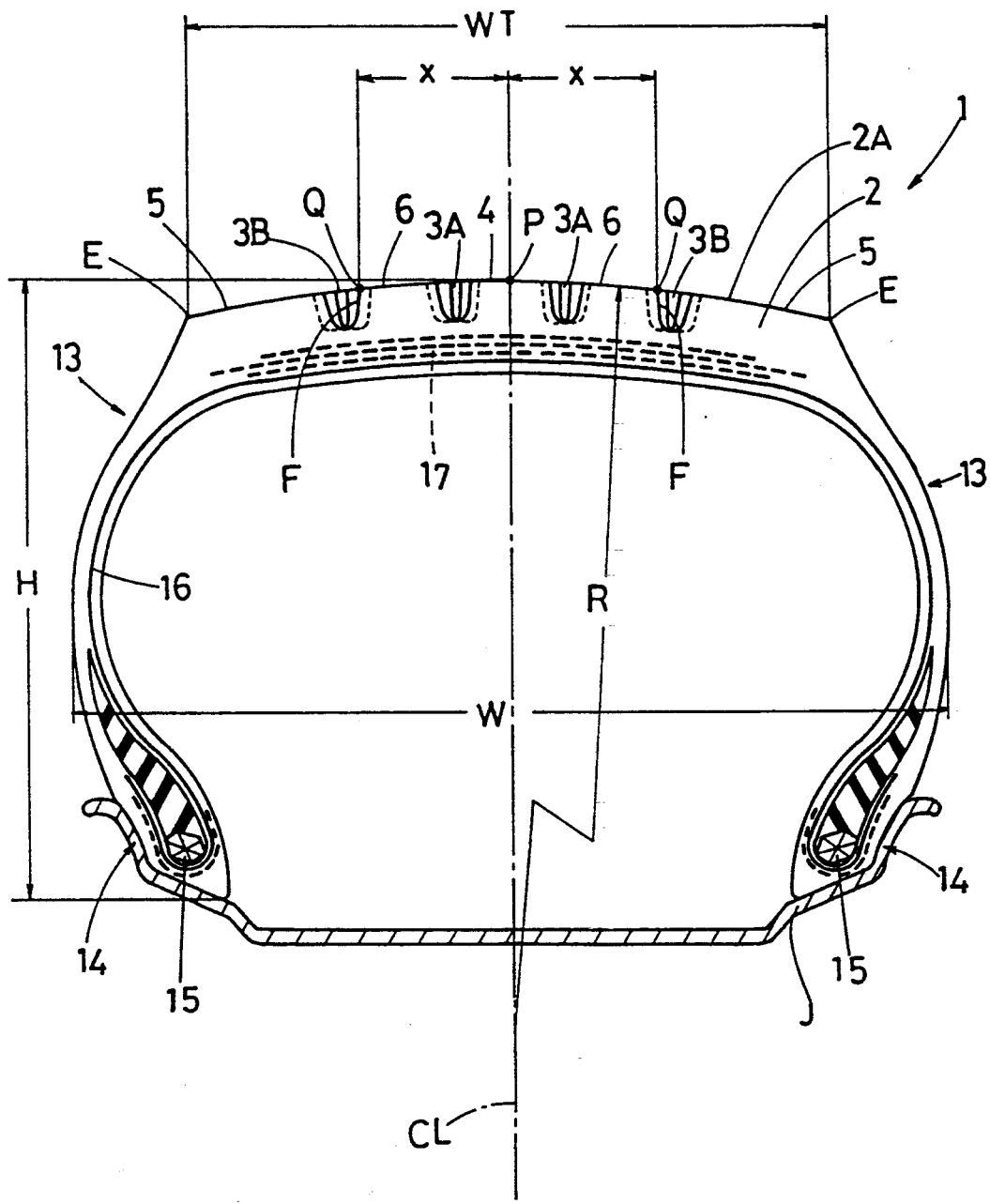
FIG. 1 is a sectional view showing an embodiment of the invention.
Figure 2:
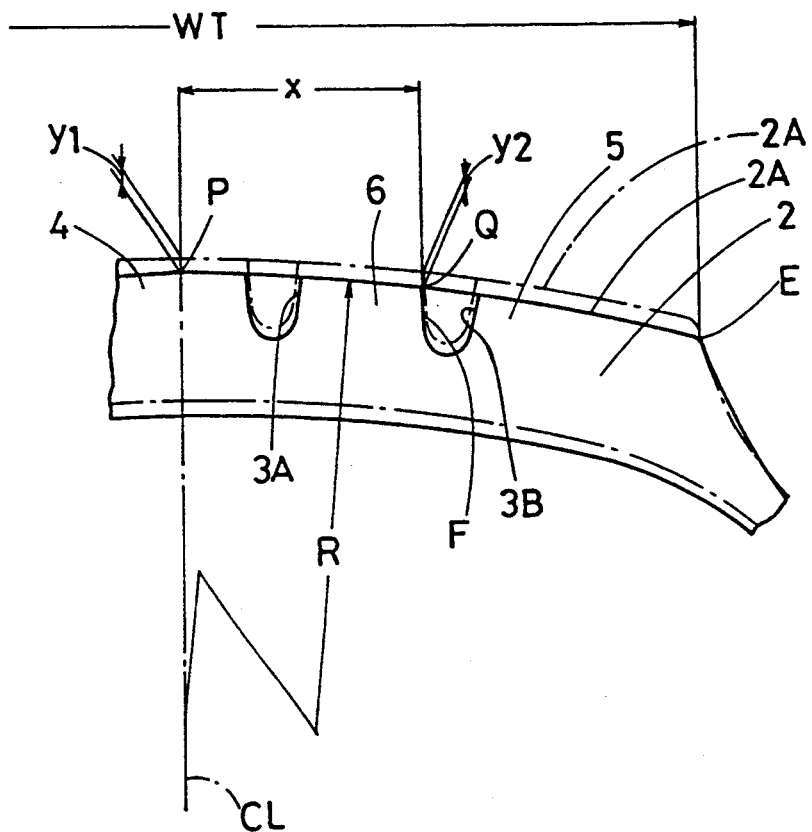
FIG. 2 is a magnified partial sectional view showing the tread surface.
Figure 3:
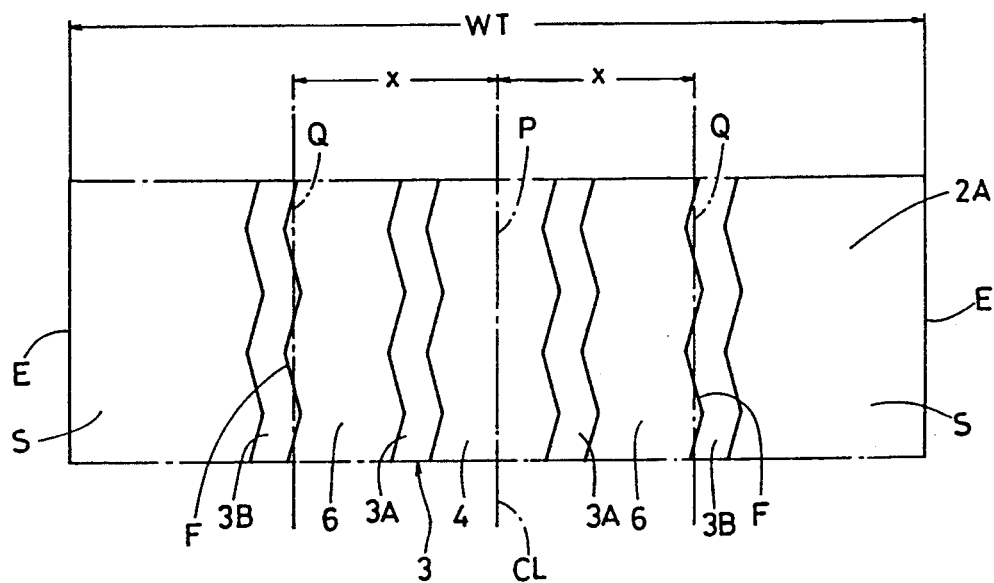
FIG. 3 is a developed plan view showing the tread surface.
Figure 4:
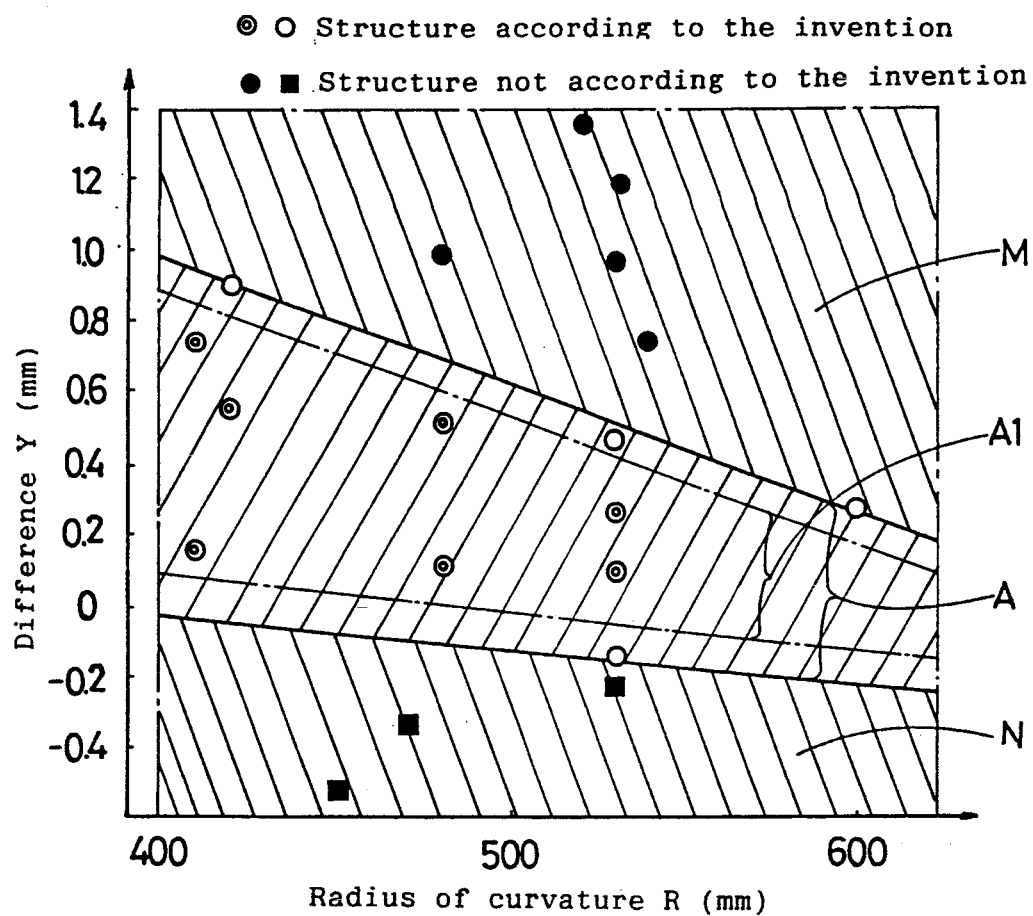
FIG. 4 is a diagram showing the relation between the radius of curvature R and the difference Y.
Figure 5:
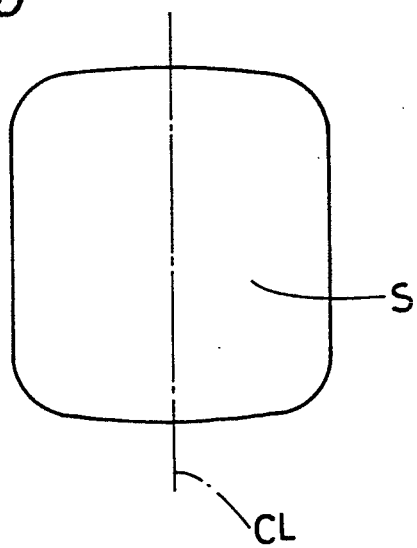
FIG. 5 is a plan view schematically showing the shape of ground-contract surface.
Figure 6:
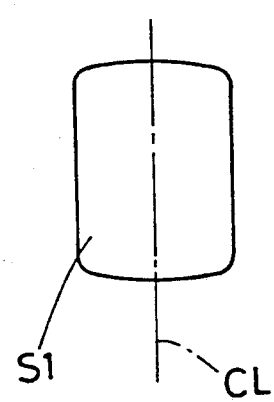
FIG. 6 is a plan view schematically showing the shape of ground-contact surface when the radius of curvature R is small.
Figure 7:
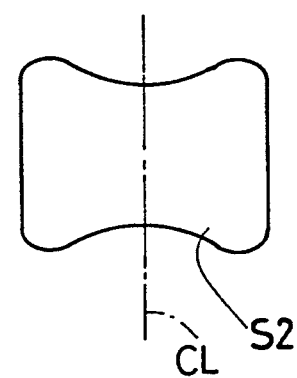
FIG. 7 is a plan view schematically showing the shape of ground-contact surface when the radius of curvature R is large.
Figure 8:
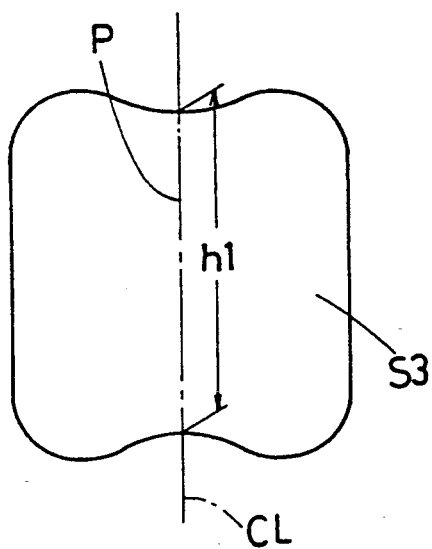
FIG. 8 is a plan view schematically showing the shape of ground-contact surface of a tire in which a center wear was observed.
Figure 9:
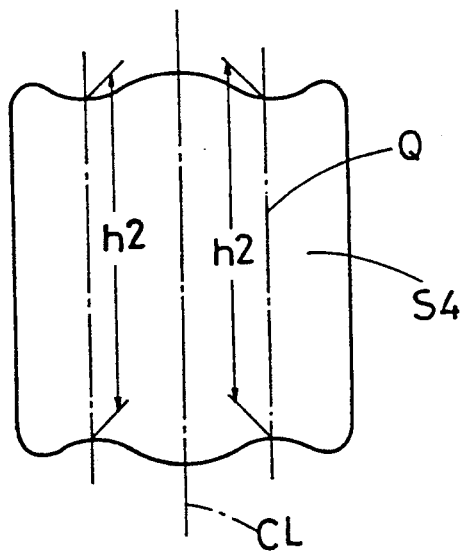
FIG. 9 is a plan view schematically showing the shape of ground-contact surface of a tire in which a river wear was observed.
Figure 10:
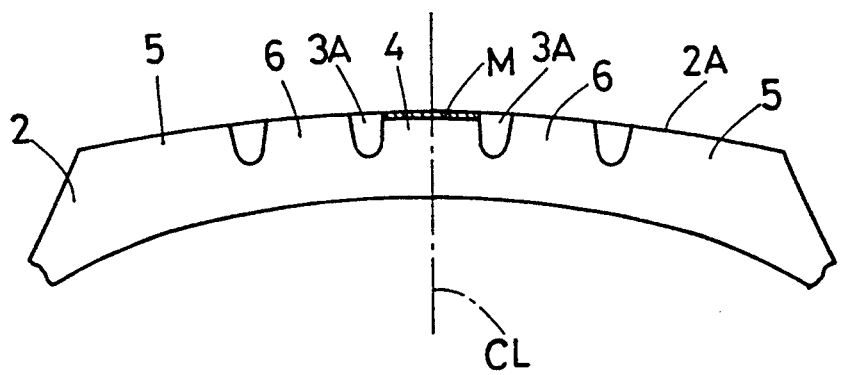
FIG. 10 is a sectional view schematically showing an occurrence of center wear.
Figure 11:
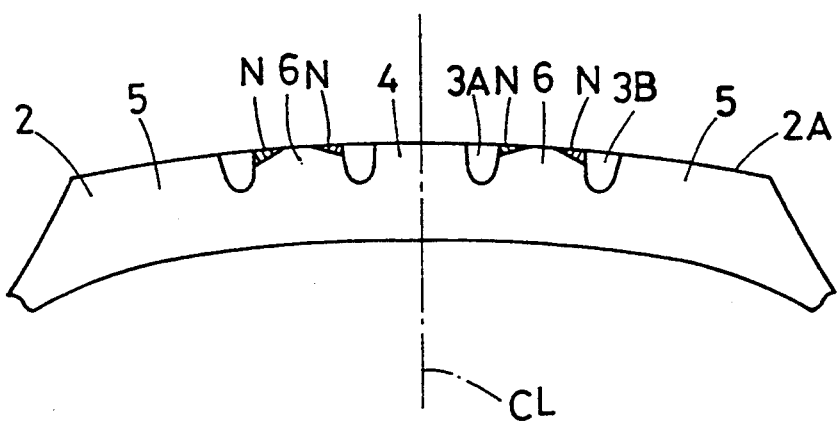
FIG. 11 is a sectional view schematically showing an occurrence of river wear.

FIG. 1 shows a tire for heavy load 1 having an aspect ratio of 80% or less in a state of 5% standard internal pressure when the tire 1 is mounted on a regular rim J and inflated by 5% of a standard internal pressure. The aspect ratio is defined as a ratio H/W of tire's sectional height H to the maximum width W.

The tire 1 comprises a carcass 16 extending from a tread part 2 through side-wall parts 13 to a bead core 15 in each of two bead parts 14 and turned up around the bead core 15 and a belt layer 17 disposed outside in the tire radial direction of the carcass 16 and in the tread part 2. In this embodiment, tire has a tire size of 295/75R22.5.

The carcass 16 has radial or semi-radial structure, and is composed of at least one carcass ply of carcass cords inclined at an angle of 70 to 90 deg. to the tire equator. The carcass cords are formed of organic fibers such as nylon, rayon, polyester or aromatic polyamide or steel. In this embodiment, the carcass is composed of one ply of steel cords.

The belt layer 17 is composed of at least one belt ply formed, similar to the carcass ply, by inclining belt cords of organic fibers such as nylon, rayon, polyester or aromatic polyamide or steel in intersecting relationship with each other. In the embodiment, the belt is composed of three plies of steel belt cords.

In the tread surface 2A, four circumferential main grooves 3 are provided, which extend in the circumferential direction of tire in parallel relationship with the tire equator. The circumferential main grooves 3 form a five-rib pattern on the tread part 2, dividing it into a center rib 4 extending on the tire equator line P, a pair of outer ribs 5 extending along a tread edge E and a pair of intermediate ribs 6 extending between the center rib 4 and the outer rib 5.

In the embodiment, inner circumferential main grooves 3A among the four circumferential main grooves 3 dividing the center rib 4 and the intermediate rib 6 and outer circumferential main grooves 3B dividing the intermediate rib 6 and the outer rib 5 are both formed in a zigzag shape. Preferably, the groove width on the tread surface 2A is in a range of 0.04 to 0.06 times the tread width WT, which is a distance in the tire axial direction between the tread edges E, and the depth is in a range of 0.04 to 0.08 times the tread width WT.

By thus forming the outer circumferential main groove 3B in a zigzag shape, the outer end line F in the tire axial direction of the intermediate rib 6 extends in the circumferential direction in zigzags.

Under the state of 5% internal pressure, the distance X in the tire axial direction from the tire equator line P to a center line Q of the zigzagged outer end line F is set at 0.25 to 0.275 times the tread width WT.

Under the state of 5% internal pressure, the tread surface 2A extends along an arc having a center on the tire equator surface CL and passing through the equator line P and the tread edges E. The single radius of curvature R of the tread surface 2A is generally set at 400 to 620 mm.

By increasing the internal pressure from the state of 5% internal pressure, although the tire body including the tread part 2 is inflated, the inflation is not uniform by part, even when limited to the tread part 2 only. The tread surface 2A is dislocated in a complicated manner as the internal pressure is increased due to, for example, the varied thickness of tread part 2, arrangement of the carcass 16 and the belt layer 17, effects of a bending deformation in the sidewall 13 and the bead 14 to the tread part 2 and the like. This invention is based on an inflation amount y1 at the equator line P where a center wear tends to occur and an inflation amount y2 at the outer end line F where a river wear tends to occur.

According to the invention, even when the outer end line F of the intermediate rib 6 is of a zigzag shape, the durability can be increased without generating a center wear or river wear by setting a difference $Y (=y2-y1)$ and the radius of curvature R to meet the following equation (1):

$$-0.001R+0.4 \ mm \leq Y \leq -0.00357R+2.4 \ mm \quad (1)$$

The difference $Y (=y2-y1)$ is obtained by subtracting the inflation amount y1 at the tire equator line P from the inflation amount y2 at the center line Q of the zigzagged outer end line F.

In the invention, the inner end line in the tire axial direction of the outer rib 5 may be formed in a straight linear shape, also the inner circumferential main grooves 3A may be formed as straight grooves.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire for heavy load with an aspect ratio of 80% or less having
   a tread part divided by four circumferential main grooves into five ribs which are a center rib extending on a tire equator, a pair of outer ribs each extending along a tread edge and a pair of intermediate ribs each extending between the center rib and the corresponding outer rib, wherein
   an outer end line in the tire axial direction of each said intermediate rib extends in the circumferential direction in zigzags,
   in a state of 5% internal pressure when the tire is mounted on a regular rim and inflated by 5% of a standard internal pressure, a distance (X) from the tire equator to a center line (Q) of said zigzagged outer end line of each said intermediate rib is in a range of 0.25 to 0.275 times the tread width (WT), and
   a single tread radius of curvature R under the state of 5% internal pressure and a difference $Y=y2-y1$, said difference $Y=y2-y1$ being the difference between an inflation amount y1 at the tire equator from the state of 5% internal pressure to a state of standard internal pressure and an inflation amount y2 at the center line (Q) of said zigzagged outer end line of each said intermediate rib from the state of 5% internal pressure to the state of standard internal pressure, satisfy the following equation:

$$-0.001R+0.4 \ mm \leq Y \leq -0.00357R+2.4 \ mm.$$

* * * * *